May 13, 1941.   D. E. STAIR   2,242,186
SMOKE PRECIPITATOR AND HEAT SALVAGER FOR FURNACE GASES
Filed Aug. 12, 1939   3 Sheets-Sheet 2
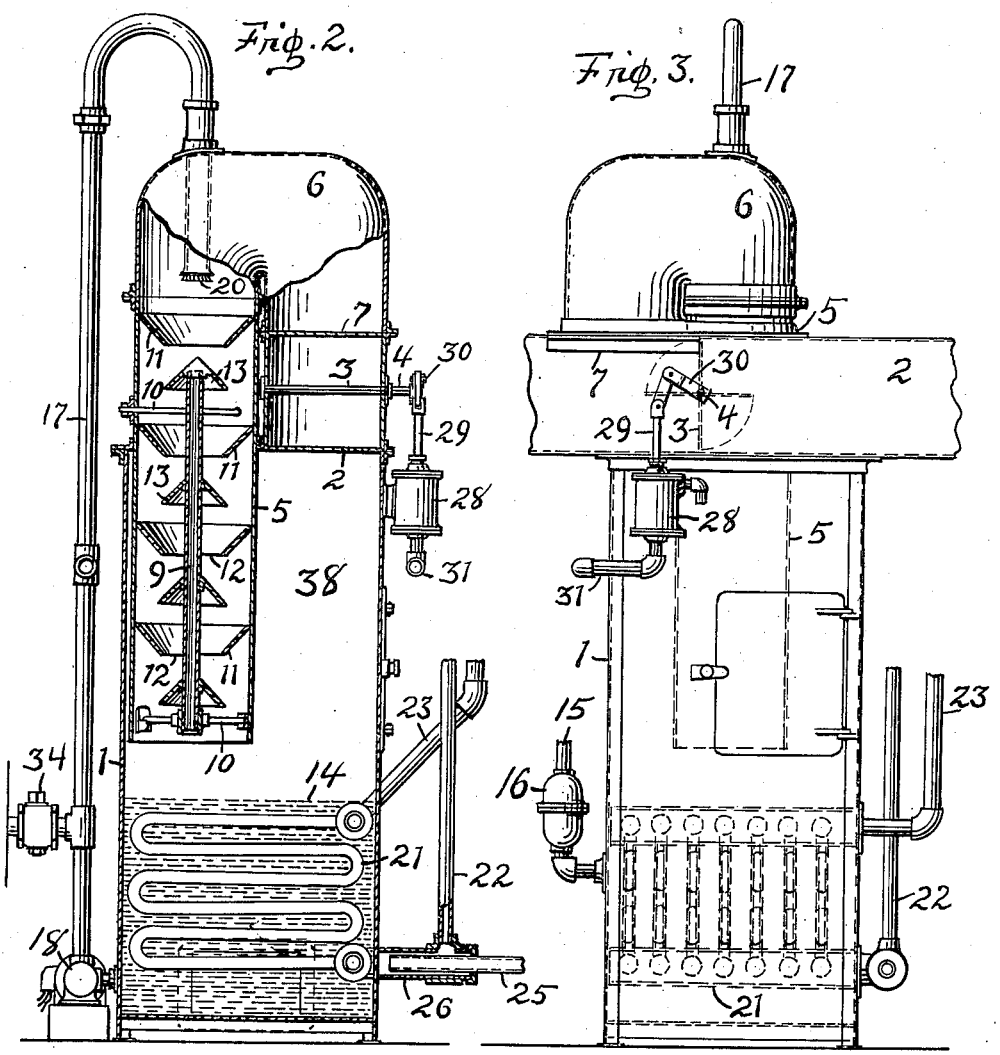
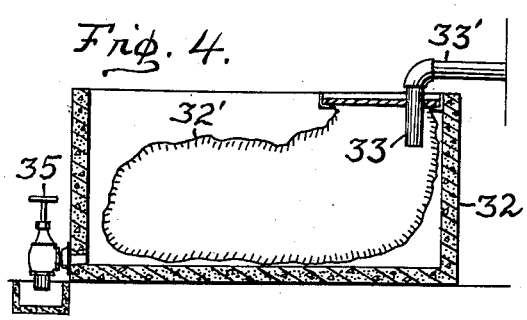
INVENTOR.
Daniel E. Stair
BY
N. G. Burns ATTORNEY.

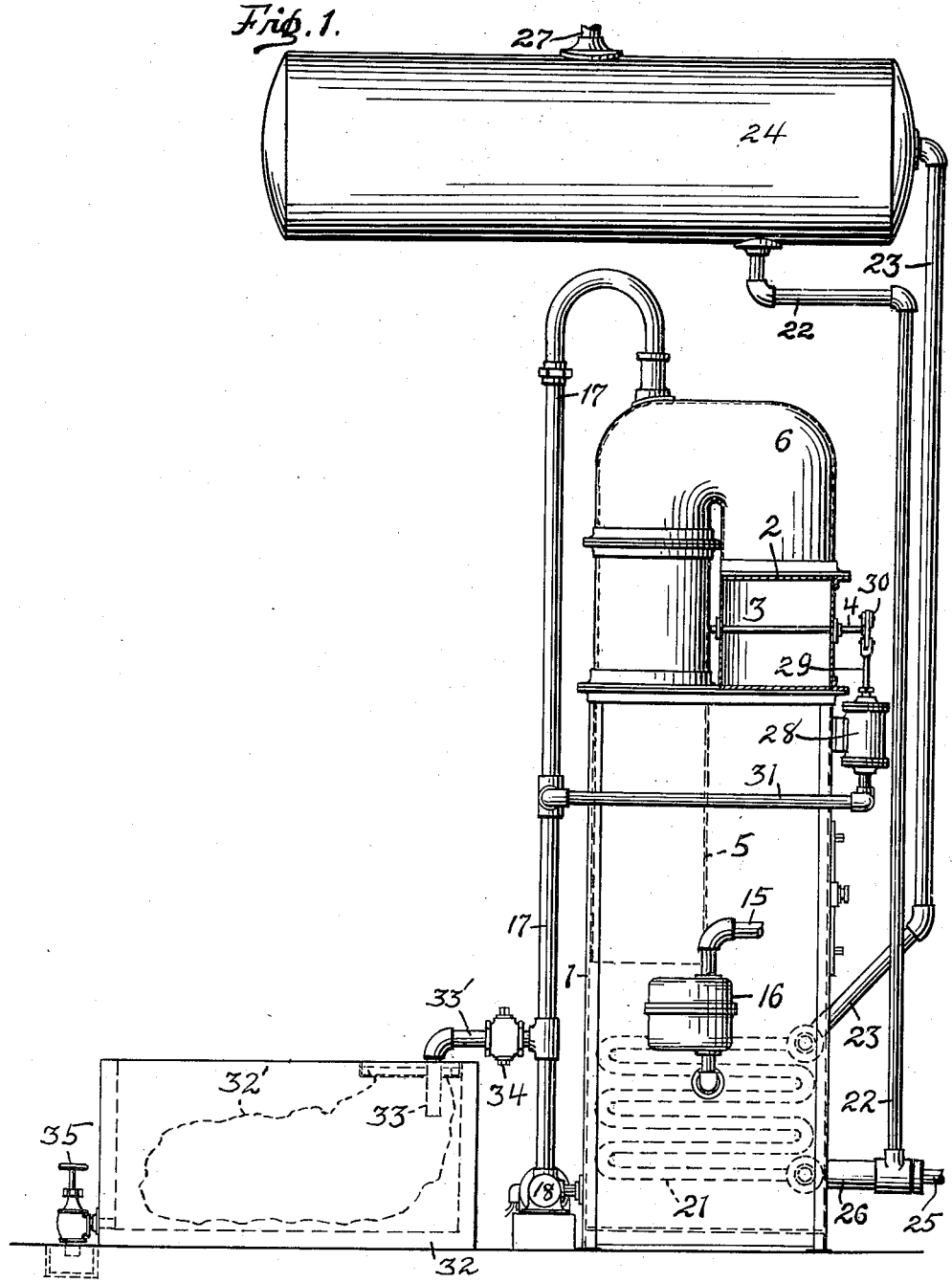

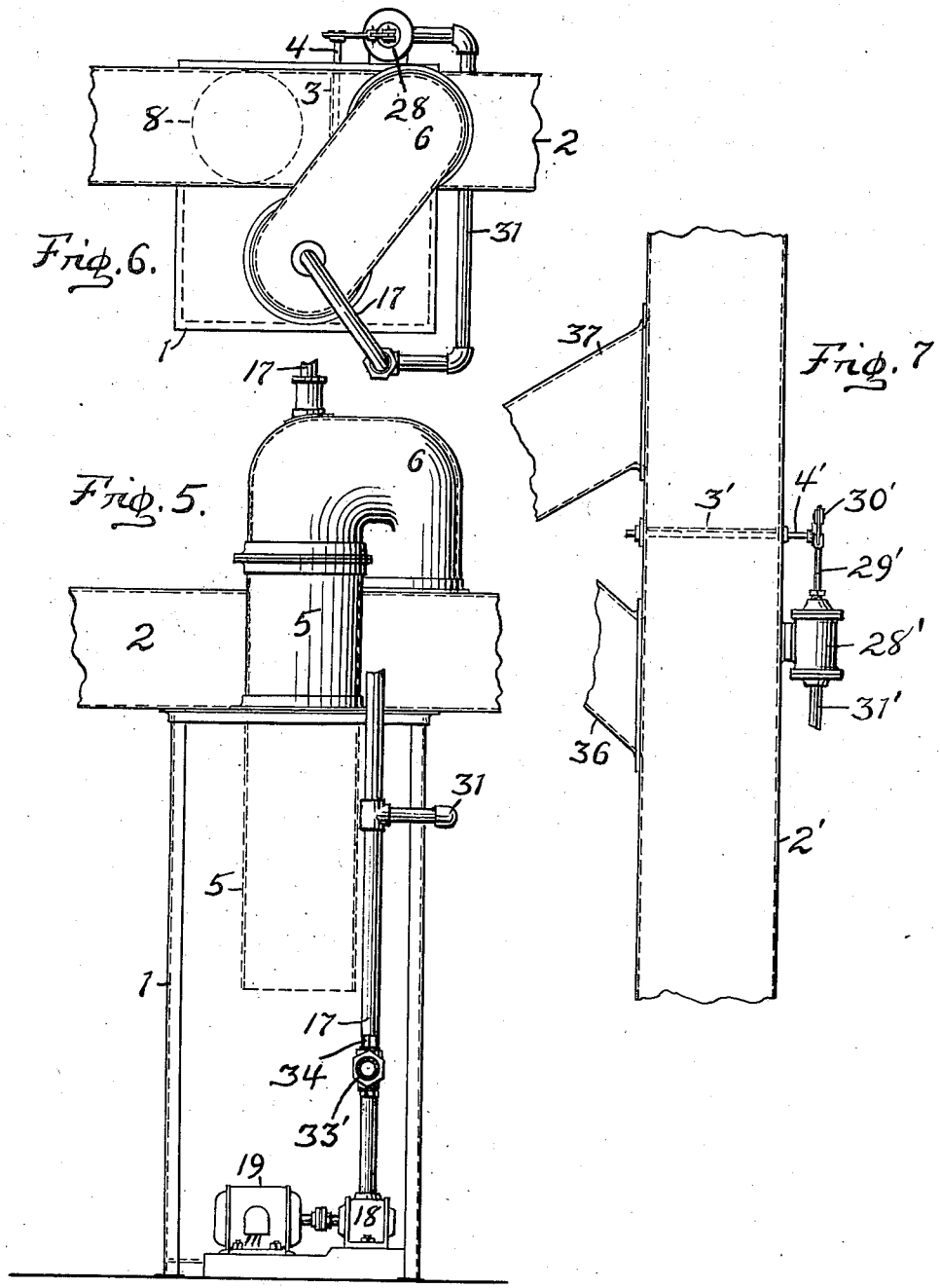

Patented May 13, 1941

2,242,186

UNITED STATES PATENT OFFICE 2,242,186

SMOKE PRECIPITATOR AND HEAT SAL-
VAGER FOR FURNACE GASES

Daniel E. Stair, Fort Wayne, Ind., assignor of one-
half to John W. Dickens, Fort Wayne, Ind.

Application August 12, 1939, Serial No. 289,933

4 Claims. (Cl. 261—9)

This invention relates to smoke precipitators and heat salvagers for furnace gases applicable to the smoke-flue of a furnace and operable in conjunction therewith.

An object of the invention is to afford apparatus having connection with a furnace smoke-flue so that the gases from the furnace pass through the apparatus and the smoke-flue to the atmosphere, and in which apparatus precipitation of the soluble products of combustion entrained with the furnace gases are separated from the escaping gases, thus to obviate contamination of the external atmosphere into which the cleansed gases finally escape.

Another object of the invention is to provide in conjunction with the smoke precipitator, apparatus for utilizing the heat of the precipitate and escaping gases, by subjecting a radiator connected in a hot water supply pipe-line to submersion in a body of water that is circulated in the precipitator, thus to heat the water passing through the radiator and the supply pipe as well as reduce the temperature of the precipitate.

Another object of the invention is to so construct the precipitator that a body of water is circulated continuously in a direction such as to accelerate the passage of the smoke from the furnace into the precipitator and the cleansed gases out through the flue to the atmosphere.

A further object of the invention is to provide in a precipitator an expansion chamber of greater cross-sectional proportion as compared with the internal diameter of the smoke-flue whereby to augment precipitation of insoluble carbon and other particles that are entrained with the gases before the gases are liberated through the smoke-flue.

A further object of the invention is to provide an automatically-operated damper the closing of which is dependent upon the pressure of the water circulated through the precipitator whereby the furnace gases are diverted from the smoke-flue into the precipitator and out through the smoke-flue only at such times as the body of water in the precipitator is being circulated, the automatically-operated damper being opened at other times to permit direct outward passage of the smoke through the smoke-flue to the atmosphere and thus circumvent passage of the furnace gases through the precipitator when the body of water in the precipitator is not in circulation.

And a still further object of the invention is to provide means automatically controlled by which is maintained in the precipitator a constant quantity of water to be circulated therein sufficient to insure complete submergence of the radiator therein at all times.

Other objects and advantages of the invention appear in the following description.

An illustrative embodiment of the invention is shown in the accompanying drawings, in which:

Fig. 1 is a front exterior view of an apparatus in which the invention is embodied;

Fig. 2 is a similar view shown partially in section to disclose the interior, other parts being omitted;

Fig. 3 is a side view projected from Fig. 2;

Fig. 4 is a detail view in section showing the filter vat for the precipitator;

Fig. 5 is a view showing the side of the apparatus opposite to that shown in Fig. 3;

Fig. 6 is a top plan view projected from Fig. 5; and

Fig. 7 is a fragmentary side view of the smoke-flue modified to permit vertical installation thereof, the automatically-operated damper being included in the view.

The illustrative embodiment of the invention is constituted of apparatus through which furnace gases pass during which certain elements entrained with the gases become precipitated and separated from the gases that are liberated subsequently to the atmosphere; an automatically-controlled appliance for supplying and circulating a volume of water in the precipitator to effect proper functioning thereof; automatic means for selectively directing the furnace gases straight through the smoke-flue or indirectly through the precipitator according to whether or not the volume of water supplied to the precipitator is in active circulation; and a heat salvaging water distributing system arranged in conjunction with the precipitator for interchange of temperature as between the precipitate and gases upon the one part and the distributing system on the other whereby to cool the precipitate and also heat the water in said distributing system.

The precipitator consists of a closed box 1 over which is positioned the smoke-flue 2 of a furnace (not shown) in which is arranged a damper 3 having an operating shaft 4, one end of which extends through the side of the smoke-flue. A smoke inlet chute 5 extends through the top of the box 1, its lower end being open and spaced at a point substantially midway between the top and bottom of the box. The upper end of the chute has connection with the top of the smoke-flue 2 at a point on the proximal side of the damper 3 through the medium of a duct 6 connected with the upper end of the chute as indicated by 7, and the smoke-flue also has communication with said box at the top thereof through a passageway 8 made in the top of the box at a point with respect to the flue on the distal side of the damper. Thus, when the damper is closed, smoke in passing from the furnace through the smoke-flue is diverted into the precipitator box and from thence re-enters the smoke-flue and thereafter the furnace gases re-enter the smoke-flue through said passageway and are discharged to the atmosphere.

Within the chute 5 is supported vertically a post 9 which is removably held in place by means of spiders 10, and a series of annular baffles 11, preferably in the form of frustums that are inwardly and downwardly inclined, are secured within the chute, their lower end being open to afford central passageways 12 therethrough. The post 9 has secured thereon a series of inverted conical baffles 13 disposed on said post at points spaced suitably distant from the adjacent annular baffles 11 correspondingly. The inverted baffles 13 on the post flare outwardly above the passageways 12 in the annular baffles 11 which extend inwardly, and thereby is provided a tortuous path in the chute 5 through which the smoke courses before entering the precipitator box 1.

The lower portion of the box 1 constitutes a sump in which is maintained a body 14 of water that is supplied thereto from a suitable source of water, under pressure, through a pipe 15 having connected in line therewith a float-controlled device 16 of any suitable type capable of admitting to the sump, water up to a predetermined level and shutting off the supply of water when said predetermined level is attained. Thus, there is maintained at all times in the sump a definite volume of water.

A pipe line 17 having a pump 18 connected in line therewith, driven by a motor 19, is connected with the lower end portion of the sump. The upper end of said pipe-line extends into the duct 6 at the top thereof and terminates at a point located above the uppermost baffle 11 and axially alined with the chute 5, there being provided a sprinkler head 20, on the pendant end of the pipe, of any suitable type adapted to cause water passing through the pipe into the chute to become sprayed. Thus, when the pump is operated, water is drawn from the lower part of the sump and circulated downwardly through the tortuous path provided by the baffles in the chute and on the post.

In the lower portion of the box 1, completely submerged in the body 14 of the water in the sump, is disposed a radiator 21 that is connected in a hot water distributing pipe-line 22—23, the ends of which are connected preferably with the bottom and end of a hot water storage tank 24.

Water under pressure is introduced from a suitable source of supply into the radiator through an injector pipe 25, disposed in the lower connection 26, that affords communication between the lower end of the pipe 22 and the lower end of the radiator 21, the arrangement being such that the flow of water through the injector pipe into the radiator tends to cause downflow of water from the bottom of the storage tank through the pipe 22 into the radiator. The top of the tank 24 has in connection therewith a hot water distributing pipe 27 that leads to points of delivery where hot water is needed.

It is desirable that the passage of smoke through the precipitator and the circulation of water from the sump through the chute are concurrent, and it is also desirable that the smoke from the furnace passes directly through the smoke-flue whenever circulation of the water through the chute for any reason ceases, thus to avoid hindering passage of smoke to the atmosphere. In order to control, selectively, passage of the smoke through the precipitator, or directly out through the smoke-flue, there is provided a controller for the damper 3, consisting preferably of a hydraulic cylinder 28 having a plunger 29 that is connected with a crank 30 on the end of the damper shaft 4. The lower end of the cylinder 28 is provided with a pipe connection 31 with the pipe-line 17, so that when pressure is created in the pipe-line 17 upon operation of the pump 18, the plunger 29 is elevated, whereupon the damper is closed causing divergence of smoke from the furnace, which then passes from the smoke-flue through the duct 6 into the precipitator, and from which the gases re-enter the smoke-flue and escape to the atmosphere. When pressure of water in the pipe-line 17 fails, the plunger 29 thereupon drops to its normal position, which causes the damper to open, thus permitting the smoke from the furnace to pass directly through the smoke-flue to the atmosphere.

There is also provided a filter-vat 32, into the top of which extends a spout 33 provided with a pipe connection 33' with the pipe-line 17, said connection having in line therewith a hand-operated valve 34. The bottom of the filter-vat 32 has a valve-controlled drain 35 through which accumulations of fluid are removed from the vat as occasions require. Also, if desired, a filtration sack 32' is arranged within the filter-vat between the spout 33 and the drain through which liquid from the sump passes before being liberated through the drain.

Upon opening of the valve 34 and operation of the pump, the fluid accumulation within the sump is withdrawn therefrom and discharged into the filter-vat, while the body of water in which the radiator is submerged in the precipitator box is replenished by a fresh supply of water through the float-controlled device 16.

In the modification of the smoke-flue illustrated in Fig. 7, the smoke-flue 2' is disposed vertically, which is sometimes desirable, and is provided, as in the former instance, with a damper 3' having an operating shaft 4' actuated by a hydraulic cylinder 28' through the medium of its plunger 29' operatively connected therewith. In this form, the smoke-flue 2' has a branch 36 that is adapted for connection with the upper end of the chute 5, and also has another branch 37 adapted for connection with the outlet passageway 8 in the top of the precipitator box. Thus, when the damper is closed, the furnace gases pass through the proximal end of the flue into the precipitator from which the cleaned gases re-enter the smoke-flue at a distal point therein and escape to the atmosphere.

*Operation*

In operation, the sump is filled with water, for circulation in the precipitator, through the float-valve controlled regulator 16 to a level above the top of the radiator 21, and the gases and entrained smoke initially are directed through the smoke-flue, while the damper is open, to the atmosphere. The pump 18 is then set in motion by operating the motor 19, whereupon, water is drawn from the sump and forced up through the pipe-line 17 and expelled through the sprinkler-head 20 onto the series of baffles within the chute 5. As pressure is created in said pipe-line by the water pumped therein, the pressure is extended into the hydraulic cylinder 28 causing its plunger to rise and close the damper. Thus, the flow of furnace gases and smoke is diverted through the duct 6 down through the chute 5 into the precipitator box 1. During the downward passage of the gases and entrained smoke through the tortuous path amongst the baffles the descending water from the sprinkler becomes mingled with the gases and smoke with attendant interchange of temperature, the flow of the gases and smoke being augmented by the downflow of the sprinkling water and the contraction of the gases due to the lowered temperature thereof. The soluble entrained matter in the gases, because of contact with the water becomes precipitated during passage down through the chute, and precipitation thereof is further augmented as the residuary gases expand while rising up through the chamber from the lower end of the chute. The velocity of the gases up through the expansion chamber 38 is somewhat reduced as compared with the downflow through the chute because of its greater containing capacity which admits of protracted precipitation within the box. Thus, as the gases re-enter the smoke-flue through the passageway 8, they have been substantially freed from smoke and other matter laden with moisture imparted by the sprinkling water that is circulated through the chute from the sump.

Should operation of the pump cease and the water pressure in the pipe-line 17 become materially reduced, the damper automatically is opened by reverse action of the plunger 29, thus re-establishing direct flow of the furnace gases and smoke through the smoke-flue to the atmosphere.

During circulation of the water from the sump through the chute, the heat absorbed by the sprinkling water from the furnace gases and smoke causes the body of water 14 in the sump to rise in temperature and the heat thereupon is imparted to the radiator 21 that is submerged in the sump and consequently, interchange of temperature between the water circulating in the precipitator and the water passing through the radiator to the hot water storage tank 24 takes place with the result that the water contained in the sump is cooled while the water passing into the storage tank is heated. The water thus supplied to the storage tank passes through the distributing pipe 27 and is utilized for such purposes as desired.

The precipitate from the smoke and gases passing through the box accumulates in the sump from which it may be periodically removed by opening the valve 34, whereupon it is expelled from the sump into the filter sack 32' located in the vat 32 where separation of solid and liquid elements of the precipitate takes place. Subsequently, the liquid precipitate is eliminated from the vat by drainage upon opening of the drain valve 35.

Normal operation of the apparatus is re-established by closing the valve 34 whereupon the water in the sump is again directed into the chute through the sprinkler-head and the damper is automatically again closed, thus diverting the furnace gases and smoke from the flue into the precipitator.

The material retained in the filter sack that may contain matter of more or less value is removed and salvaged by resort to various known processes for that purpose.

By use of the invention, abatement of the so-called "smoke nuisance" is effected to a substantial extent, a hot water supply is furnished, and also there is retrieved from the wastes generally occasioned by consumption of fuel in furnaces valuable by-products.

Variations from the particular construction above disclosed may readily be made by exercise of engineering skill without departure from the spirit or scope of the invention, and the following claims are intended to be inclusive of such variations.

What I claim is:

1. Apparatus for the treatment of smoke, said apparatus consisting of a closed box provided with a chute extending through the top thereof having connection with a smoke-flue at a proximal point thereon and having a passageway communicating with said smoke-flue at a distal point thereon, a damper in said smoke-flue located between said points, a body of water disposed in said box the normal level of which is in a plane spaced below the lower end of said chute, means for supplying water automatically to said body of water to maintain the volume thereof, a pipe-line having a pump connected therein, the lower end of said line having connection at one end with the lower part of said box, its upper end having a sprinkler-head that is disposed in the upper end of said chute, a series of stationary baffles secured in said chute, a support removably disposed in said chute provided with a second series of baffles arranged alternately between said stationary baffles to provide a tortuous path for smoke within the chute, an automatically-operated means for actuating said damper having connection with said pipe-line so arranged as to cause closing of the damper only during circulation of said body of water through the pipe-line, and means for cooling said body of water.

2. A smoke precipitator consisting of a box providing a sump and a precipitating chamber, an inlet chute extending into the top of the box having communication with a smoke-flue at a proximal point thereon, said box having a passageway communicating with said smoke-flue at a distal point thereon, a damper in said smoke-flue located between said points, means for maintaining a body of water in said sump, a pump having connections with said sump and the upper end of said chute for circulating water from the sump through said chute into the precipitating chamber, an actuating member for said damper operated by water pressure circulated by said pump so arranged as to cause closing of said damper when said pump is operated, and means for cooling said body of water.

3. A smoke precipitator consisting of a box providing a precipitating chamber and a sump, a chute extending downwardly into said chamber, the lower end of said chute terminating at a point spaced above the sump and its upper end having communication with a smoke-flue at a proximal point thereon and said chamber having communication with said smoke-flue at a distal point thereon, a damper for directing smoke and gases from said flue into said chute upon closing of said damper, a pump, the suction side of which has connection with said sump at a point adjacent the lower end thereof, a pipe-line connected with the discharge side of the pump the opposite end of said line having a sprinkler-head disposed to discharge water downwardly through the chute into said chamber, a spout having a valve-controlled connection with said pipe-line through which to withdraw precipitate from said pump, automatically controlled means for supplying water to said sump and maintain a predetermined level of the water therein, and an actuating member for said damper having connection with said pipe-line whereby said damper is automatically closed by pressure of water in said pipe-line.

4. A smoke precipitator having a box providing a precipitating chamber and a sump, a chute having baffles disposed therein, said chute extending into and terminating at its lower end within said chamber, a smoke-flue having separate communicating connections with said chute and the chamber, a damper in said smoke-flue located between said connections whereby to cause the flow of furnace gases selectively through the precipitator or directly through the smoke-flue accordingly as the damper is closed or opened, means in connection with the sump and the chute to cause water contained in the sump to circulate downwardly through said chute, automatically controlled means for supplying water to said sump and maintaining a predetermined level of the water therein, and an operating member having connection with said damper and said means activated by pressure of the water in said means whereby the damper is automatically closed during circulation of the water through the chute and opened when said circulation ceases.

DANIEL E. STAIR.